United States Patent [19]

Ferraro et al.

[11] Patent Number: 4,893,767
[45] Date of Patent: Jan. 16, 1990

[54] HELICOPTER CABLE AND EQUIPMENT GUIDE WITH SHOCK ABSORBENCY

[75] Inventors: John R. Ferraro, Clinton; Philip P. Foerster, Waterbury; Alan Rockall, Oxford, all of Conn.; Steven R. Schwarz, Cranbury, N.J.

[73] Assignee: United Technologies Corporation, Hartford, Conn.

[21] Appl. No.: 210,960

[22] Filed: Jun. 24, 1988

[51] Int. Cl.⁴ .............................................. B64C 1/22
[52] U.S. Cl. ................................ 244/118.1; 254/323; 244/137.1
[58] Field of Search ....................... 254/329, 389, 323; 114/179–181, 243; 244/129.1, 129.4, 137.1, 137.4, 118.1; 226/198, 196; 242/157 R

[56] References Cited

U.S. PATENT DOCUMENTS

| | | | |
|---|---|---|---|
| 2,529,486 | 11/1950 | Clarkson et al. | 242/157 R |
| 3,176,940 | 4/1965 | Echeverria | 244/118.1 |
| 4,013,270 | 3/1977 | Laky et al. | 254/269 |
| 4,244,561 | 1/1981 | Campbell et al. | 244/137.1 |

FOREIGN PATENT DOCUMENTS

| | | | |
|---|---|---|---|
| 1093061 | 1/1981 | Canada | 254/389 |
| 3138646 | 4/1983 | Fed. Rep. of Germany | 254/389 |
| 187980 | 11/1966 | U.S.S.R. | 254/389 |

Primary Examiner—Joseph F. Peters, Jr.
Assistant Examiner—Anne Sartelle

[57] ABSTRACT

A cable and equipment guide (35) for a helicopter (10) comprises a funnel (60) formed from a single thickness of malleable and polishable material, fixed to the helicopter fuselage (15) by a resilient mount comprising a bracket (120) carrying an elastomeric bushing (130) and a coil spring (70).

10 Claims, 1 Drawing Sheet

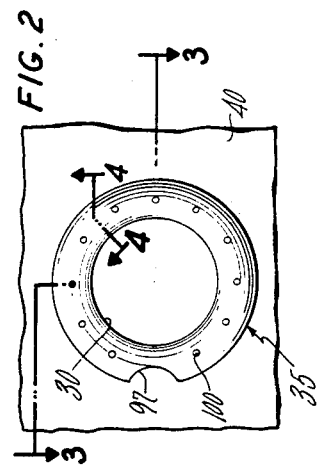
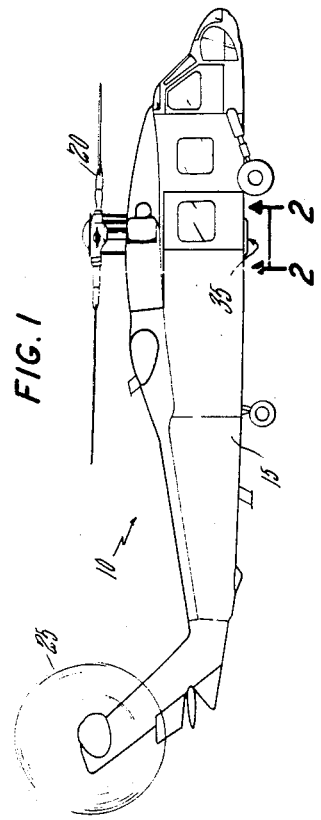
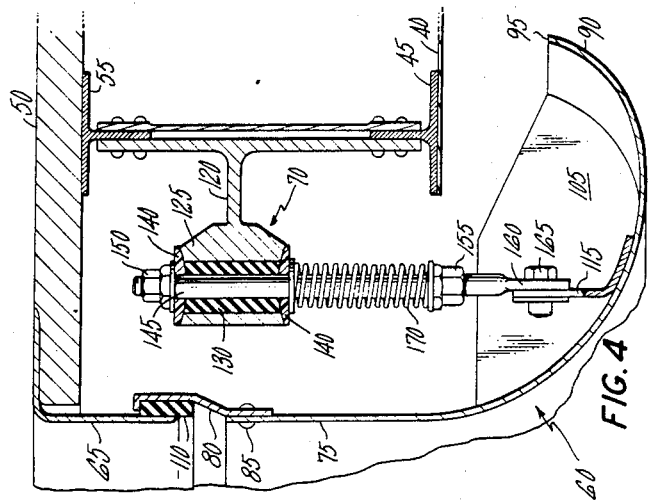
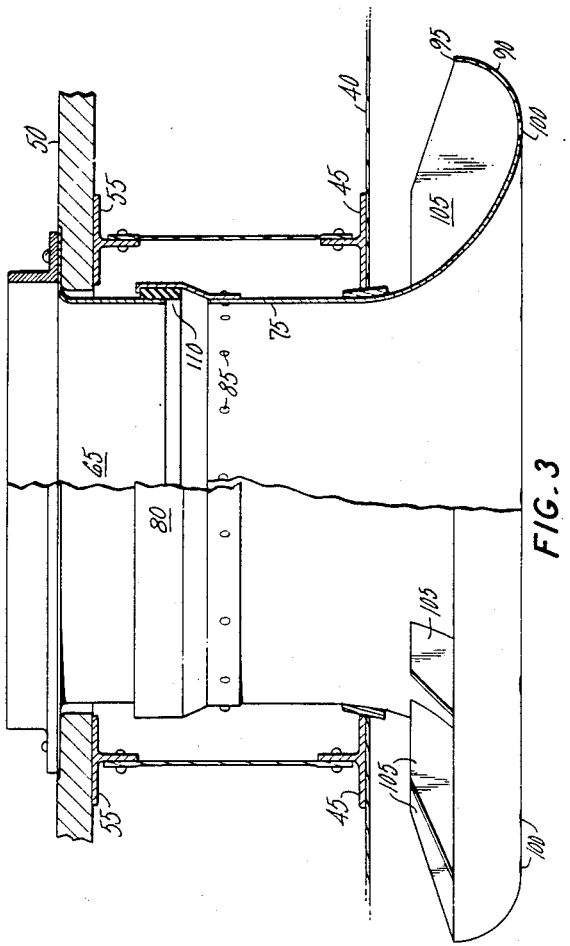

HELICOPTER CABLE AND EQUIPMENT GUIDE WITH SHOCK ABSORBENCY

This invention was made with Government support under a contract awarded by the Department of the Navy. The Government has certain rights in this invention.

DESCRIPTION

1. Technical Field

This invention relates to a cable and equipment guide for helicopters.

2. Background Art

Helicopters such as the SH-60F (CV Helo) and the SH-3H helicopters manufactured by the Sikorsky Aircraft Division of United Technologies Corporation, often employ equipment which is tethered to the interior of the helicopter by high strength metallic cables.

Such equipment may take the form of sonar transducers which are lowered by the cable into the sea while the helicopter hovers thereover to gather information on the presence of submarines or other submersible military equipment. Military helicopters may also employ transducers which are towed by the helicopter at or near the ocean's surface for mine sweeping. Both civilian and military helicopters may employ various other devices such as cargo hooks or personnel rescue devices.

In some instances, it has been the practice to provide the opening in the helicopter fuselage through which the cable is lowered and raised, with a guide for alignment of the cable and equipment with the opening as the equipment is lowered from and reeled into the aircraft. In general, such guides are funnel-shaped and in the past, have been rigidly mounted to the helicopter fuselage. Guides, such as those employed in the above-noted Sikorsky SH-3H helicopter comprise a truncated, conical funnel, formed from a single thickness of sheet aluminum rigidly fixed to the helicopter fuselage and provided at the lower edge thereof with a rubber lip to provide some cushioning of the lip against impact of the tethered apparatus with the lip as the apparatus is reeled into the helicopter. More recent guides comprise laminar, rigidly mounted funnels of foam, sandwiched between an outer layer of sheet aluminum and an inner layer of fiberglass, the foam providing a measure of cushioning against the impact of the equipment with he funnel.

Such prior art guide constructions have exhibited various shortcomings. For example, the funnel employed in the SH-3H helicopter exhibits only a very limited capacity for absorbing the energy of impact of the equipment with the funnel as the equipment is reeled into the helicopter. The laminar funnel, while providing some impact cushioning, is difficult to mount to and remove from the helicopter fuselage due in part to the bulk of the laminar construction. Also due to its laminar construction, the back surface of the aluminum layer is inaccessible for removing dents and other deformities from impact of the tethered equipment with the funnel. It has been found that contact of the tether cable with such deformities in the funnel leads to premature wear and, therefore, premature failure of the cable thereby requiring its frequent replacement. Furthermore, such impact of the equipment with the funnel permanently compresses the funnel's foam interior layer, thereby reducing its ability to cushion against subsequent equipment impact therewith.

DISCLOSURE OF INVENTION

It is therefore a principle object of the present invention to provide an improved helicopter equipment and cable guide.

In accordance with the present invention, an equipment and cable guide for a helicopter comprises a funnel formed from a single thickness of a malleable and polishable material, resiliently mounted to the fuselage of the helicopter by shock absorbing means which accommodate the mechanical loading of the funnel due to impact with the tethered equipment and the cable bearing against the funnel by allowing vertical, longitudinal, and lateral movement of the funnel. In the preferred embodiment, vertical loading of the funnel is absorbed by a coil spring while longitudinal and lateral loads thereon are absorbed by an elastomeric bushing, both of which are carried by a bracket fixed to the helicopter fuselage. The shock absorbing capability of the funnel mount obviates layers of foam or other cushioning means in the funnel itself and, therefore, the funnel is economically manufactured from a single sheet of aluminum or other suitable metal. Such a funnel construction renders damage to the funnel from impact with the tethered equipment, easily repairable by hammering from the inside surface thereof and subsequent polishing. This construction also allows the funnel to be conveniently mounted at readily accessible locations, proximal to the outer edge of the funnel for ease of removal and replacement. The funnel may carry a sliding seal which engages a baffle disposed around the equipment opening in the helicopter fuselage, thereby sealing environmental contaminants from the funnel mounts. The funnel may be generally horn-shaped, having an outwardly flared lower end portion with a reverse bend therein. Such an outwardly flared reverse bend readily accommodates a circumferential distribution of radially extending stiffening ribs and a circumferential distribution of holes for drainage.

BRIEF DESCRIPTION OF DRAWINGS

FIG. 1 is an elevation of a helicopter of the type which employs the equipment and cable guide of the present invention.

FIG. 2 is a plan view of the guide taken in the direction of line 2—2 of FIG. 1.

FIG. 3 is an elevation of the guide of the present invention taken along line 3—3 of FIG. 2 and partially sectioned to show details of the construction thereof; and FIG. 4 is a sectional view of the guide of the present invention taken in the direction of line 4—4 of FIG. 2.

BEST MODE FOR CARRYING OUT THE INVENTION AND INDUSTRIAL APPLICABILITY THEREOF

FIG. 1 of the drawing illustrates a helicopter 10 such as a Sikorsky Aircraft SH-60F (CV Helo) helicopter having a fuselage 15, a main rotor 20, and a tail rotor 25. The bottom of the fuselage is provided with an opening 30 (FIG. 2) within which the cable and equipment guide 35 of the present invention is received.

Guide 35 is useful with any aircraft which employs equipment tethered to the interior of the fuselage by a cable, the equipment being deployed by lowering the cable through opening 30 and retrieved, by pulling the cable and the equipment through opening 30 by an hydraulic or electric winch or the like (not shown). Thus, the guide of the present invention may be used in military helicopters which deploy tethered sonar transducers as well as military or civilian helicopters which may deploy such equipment as rescue slings or carriers, cargo hooks or the like.

Referring to FIGS. 2–4, fuselage 15 includes an outer skin 40 supported by structural frame members 45 as well as a cabin floor 50 supported by structural frame members 55. Thus, opening 30 through which the tethered equipment is raised and lowered is defined by corresponding openings in the floor and outer skin of the aircraft.

The guide of the present invention broadly comprises a funnel 60 sealed to a baffle 65 which surrounds the opening in the floor 50 and means 70 for mounting the funnel for three-dimensional movement thereof with respect to the helicopter fuselage.

Funnel 60 is sized to accommodate the tethered equipment therewithin and comprises a generally horn-shaped member of a thickness of from 0.02–0.05 cm of a malleable and polishable material such as sheet aluminum or the like formed, for example, by spinning. The funnel includes a generally cylindrical upper portion 75 to which an annular flange 80 is fixed as by rivoting at 85, and an outwardly flaired, reverse bend portion 90 the edge 95 of which defines the radially outer rim of the funnel. As shown, the reverse bend accommodates a circumferential distribution of drain holes 100 which may be formed therein by drilling as well as a circumferential distribution of radially extending, stiffening ribs 105 which may be formed from the same material as the funnel. The ribs my be attached to the funnel by any suitable means such as welding, brazing or other suitable fusion bonding techniques.

Flange 80 carries thereon an annular elastomeric seal 110 which slidably engages the radially outer surface of baffle 65. The reverse bend portion 90 of the funnel is also provided with a plurality of L-shaped sheet metal brackets 115 attached to the funnel by any suitable fusion bonding technique. Brackets 115 are drilled for attachment to mounting means 70.

Mounting means 70 comprises a fixture (bracket) 120 attached to the helicopter fuselage by, for example, riveting to upper and lower structural members 55 and 45. The bracket includes a cylindrical bushing 125 formed integrally therewith, the bushing accommodating an inner, elastomeric, shock absorbing bushing 130 (second shock absorbing means). Drilled end caps 140 are fitted to bracket bushing 125 for retention of elastomeric bushing 130 therewithin and to prevent the longitudinal compression thereof due to the weight of the funnel.

Elastomeric bushing 130 slidably receives a rod 145 therewithin, the rod being threaded at upper and lower portions thereof. A nut 150 threaded onto the rod's upper end provides vertical restraint of the rod against movement through upper cap 140. Nut 155 threaded onto a lower portion of the rod functions as a spring retainer. The rod includes at the lower end thereof an integral, drilled lug 160 at which rod 145 is fixed to bracket 115 by bolted connection 165. A coil spring 170 (first shock absorbing means) is retained on rod 145 between lower bushing cap 140 and retaining nut 155. In the preferred embodiment, the funnel is fixed to the fuselage by four such mounts, equally spaced around the fuselage opening.

The guide of the present invention accommodates mechanical loading of the funnel and impacts thereon as the equipment is drawn upwardly into the helicopter, with minimum risk of injury to the equipment or the funnel itself. As best seen in FIG. 4, as the tethered equipment is drawn into the helicopter, should the equipment strike funnel 60, the funnel moves upwardly, restrained only by the reactive force of compressed spring 170. As the funnel moves upwardly, rod 145 and seal 110 will likewise move upwardly, the engagement of the rod end and the upper edge of flange 80 with the helicopter floor providing vertical stops for the movement of the funnel. Of course, impact of the tethered equipment with the funnel will also load the funnel to a certain degree in a longitudinal (with respect to the fuselage) direction, or a lateral direction, or a direction having both longitudinal and lateral components. Such loading of the funnel is accommodated by radial compression of bushing 130. Oblique (tilted) loading of the funnel by the cable bearing thereagainst is accommodated primarily by the distortion of the elastomeric bushings 130 as well as some distortion of springs 170 and some compression of seal 110.

It will be noted that unlike prior art helicopter cable and equipment guides which offer either no significant shock absorbing capability or shock absorbing capability only by the deformation of a foam laminate the guide hereof accommodates loading by means of restrained movement of the funnel itself. Since such loading is accommodated by funnel movement and not distortion thereof, the guide is more reliable, requiring infrequent funnel replacement and additionally, is less likely to cause premature wear of cables passing therethrough due to contact of the cable with dented or otherwise damaged portions of the funnel. Thus, cables employed with this guide are less likely to fail prematurely. Moreover, since significant shock absorption is not provided by the funnel itself, the funnel may be manufactured from a single thickness of metal without provision of a laminar foam cushion. Accordingly, the interior of the reverse bend of the funnel is easily accessed for ease in removing and replacing the funnel by unbolting the funnel from rod 145 at brackets 115. The single metallic sheet from which the funnel is formed may also be made thicker than metallic laminates in prior art funnels since the funnel is not required to absorb shocks by the distortion thereof. Such added thickness allows the funnel to be conveniently repaired by hammering out from the back of the funnel, any dents which may occur therein and then polishing the hammered portions, whereby the funnel will have a much longer service life than those funnels employed in prior art guides. Since access to the interior of the reverse bend is so convenient, contaminants such as sea water are readily washed out of the funnel to minimize corrosion problems therein, the funnel being self-draining through drain holes 100.

While a particular embodiment of the cable and equipment guide of the present invention is described and illustrated herein, it will be appreciated that various modifications may be made without departing from the present invention. Accordingly, while specific materials such as aluminum for the funnel have been mentioned, it will be appreciated that various other materials as dictated by the environment in which the guide is employed and the equipment accommodated therethrough, will suggest themselves to those skilled in the art. Likewise, while various dimensions have been noted, these dimensions are only exemplary. Accordingly, it is intended by the following claims to cover these and any other modifications as fall within the true spirit and scope of this invention.

Having thus described the invention, what is claimed is:

1. A guide for disposition within an opening in the fuselage of a helicopter for deploying and retrieving equipment tethered to the interior of said helicopter by a cable, said guide comprising a funnel for receiving said cable and equipment therethrough said funnel being mechanically loaded by the impact of said equipment thereon and by said cable bearing thereagainst, said guide being characterized by:
   said funnel comprising a single thickness of a malleable and polishable material; and
   means for mounting said funnel for three dimensional movement thereof with respect to said helicopter fuselage, said mounting means comprising:
   a first shock absorbing means for accommodating said loading by resiliently opposing vertical movement of said funnel independently of any longitudinal or lateral movement thereof; and
   a second shock absorbing means, mounted separately from said first shock absorbing means, for accommodating said loading by resiliently opposing longitudinal and lateral movement of said funnel independently of any vertical movement thereof.

2. The guide of claim 1 characterized by said first shock absorbing means comprising a spring.

3. The guide of claim 2 characterized by said mounting means comprising:
   a fixture attached to said helicopter fuselage; and
   a rod fixed to said funnel, said rod being received within the interior of said spring and slidably received within said fixture, and including a spring retainer thereon;
   said spring comprising a coil spring retained between said fixture and spring retainer.

4. The guide of claim 3 characterized by said funnel having a radially outer rim portion, said rod being fixed to said funnel proximally to said radially outer rim portion for ease in disassembly of said funnel from said mounting means.

5. The guide of claim 3 characterized by said second shock absorbing means comprising a generally annular, elastomeric bushing, said elastomeric bushing being retained by said fixture and receiving said rod therethrough;
   whereby said longitudinal and lateral movement of said funnel is accommodated by radial compression of said elastomeric bushing.

6. The guide of claim 1 characterized by said funnel being formed from sheet metal and being from approximately 0.02 to approximately 0.05 cm in thickness.

7. The guide of claim 1 characterized by:
   an annular baffle fixed to said fuselage and extending around the circumference of said opening;
   said funnel having an inner rim portion and further including a seal disposed about said inner rim portion, said seal being in sliding engagement with said annular baffle to seal environmental contaminants from said mounting means.

8. The guide of claim 7 characterized by said seal being formed from an elastomeric material.

9. The guide of claim 1 characterized by said funnel including a lower end portion having an outwardly flaired, reverse bend, said reverse bend being provided therein with a circumferential distribution of drain holes.

10. The guide of claim 1 characterized by said funnel including a lower end portion having an outwardly flaired, reverse bend said reverse bend accommodating therein a circumferential distribution of generally radially oriented stiffening webs.

* * * * *